United States Patent
Kern, II et al.

(10) Patent No.: US 11,263,167 B2
(45) Date of Patent: Mar. 1, 2022

(54) METHODS AND SYSTEMS FOR TRANSMITTING ARRAYS OF SEQUENCED DATA BLOCKS

(71) Applicant: Verizon Patent and Licensing Inc., Arlington, VA (US)

(72) Inventors: Richard John Kern, II, Dickson City, PA (US); Vidhya Seran, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 16/834,822

(22) Filed: Mar. 30, 2020

(65) Prior Publication Data

US 2021/0303507 A1    Sep. 30, 2021

(51) Int. Cl.
*G06F 15/173* (2006.01)
*H04L 67/141* (2022.01)
*H04L 67/1074* (2022.01)

(52) U.S. Cl.
CPC ...... *G06F 15/17331* (2013.01); *H04L 67/108* (2013.01); *H04L 67/141* (2013.01)

(58) Field of Classification Search
CPC ............ G06F 15/17331; H04L 67/108; H04L 67/141
See application file for complete search history.

(56) References Cited

U.S. PATENT DOCUMENTS

| | | | |
|---|---|---|---|
| 2017/0039150 A1* | 2/2017 | Dreier | G06F 12/023 |
| 2017/0163542 A1* | 6/2017 | Dajani | H04L 69/14 |
| 2017/0293588 A1* | 10/2017 | Narayanaswamy | H04L 61/2061 |
| 2017/0373813 A1* | 12/2017 | Asterjadhi | H04W 28/06 |

* cited by examiner

*Primary Examiner* — Michael A Keller (57) ABSTRACT

An exemplary method includes establishing, by a sending device, a communication session with a receiving device, the communication session configured to transfer an array of related, sequenced data blocks from the sending device to the receiving device. The method includes sending one or more parameter messages including parameters associated with the array of data blocks. The method includes receiving one or more parameter acknowledgement messages to the one or more parameter messages, the one or more parameter acknowledgement messages including a plurality of memory addresses of the receiving device, the plurality of memory addresses including a respective memory address for each data block of the array of data blocks. The method includes sending the array of data blocks to the receiving device, each data block of the array of data blocks sent to the respective memory address using a remote direct memory access (RDMA) protocol.

19 Claims, 6 Drawing Sheets

METHODS AND SYSTEMS FOR TRANSMITTING ARRAYS OF SEQUENCED DATA BLOCKS

BACKGROUND INFORMATION

Extended reality technologies (e.g., virtual reality technology, augmented reality technology, mixed reality technology, etc.) allow users to experience extended reality worlds in a variety of entertainment, educational, vocational, and other enjoyable and/or valuable types of applications. In certain examples, extended reality worlds may be implemented as partially or fully simulated realities based on real world places and objects that would be difficult, inconvenient, expensive, or otherwise challenging for users to experience in a non-simulated manner. In at least some of these examples, real world places and objects may be captured and represented in real time so as to allow the places and objects to be virtually experienced live as events in the real world are ongoing.

While much value may be derived from extended reality experiences based on real-world scenes, many challenges are associated with capturing, processing, and transmitting such extended reality media content. For example, there remains room for improvement in protocols for transmitting the immense amounts of data for providing content representative of large real-world scenes with large numbers of objects in ways that are efficient and scalable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for transmitting arrays of sequenced data blocks are described herein. For example, a sending device (e.g., a content generation system, a content distribution system, etc.) may send an array of related, sequenced blocks of data to a receiving device (e.g., a content presentation system). Such blocks of data may include large amounts of data to be transmitted, such as content to be presented by the receiving device. A remote direct memory access (RDMA) protocol may be an effective means for transmitting such data blocks. However, various parameters and conditions must be met for both the sending device and the receiving device for an RDMA transmission to be successful. A transfer protocol configured to meet such parameters and conditions for transmission of an array of related, sequenced data blocks using RDMA may allow for efficient transmission of data blocks.

For instance, the sending device may establish a communication session with the receiving device, the communication session configured to transfer an array of related, sequenced data blocks from the sending device to the receiving device. The sending device may send one or more parameter messages including parameters associated with the array of related, sequenced data blocks. The sending device may further receive one or more parameter acknowledgement messages to the one or more parameter messages, the one or more parameter acknowledgement messages including a plurality of memory addresses of the receiving device, the plurality of memory addresses including a respective memory address for each data block of the array of related, sequenced data blocks. Further, the sending device may send the array of related, sequenced data blocks to the receiving device, each data block of the array of related, sequenced data blocks sent to the respective memory address using a remote direct memory access (RDMA) protocol.

Various benefits may arise from the methods and systems for transmitting sequenced data blocks described herein. For example, illustrative protocols may enable devices to efficiently and effectively agree on parameters so that the devices may transfer arrays of sequenced data blocks via RDMA while avoiding errors typically encountered using RDMA in conventional ways. Various embodiments will now be described in more detail with reference to the figures. The disclosed methods and devices may provide one or more of the benefits mentioned above and/or various additional and/or alternative benefits that will be made apparent herein.

Figure 1:
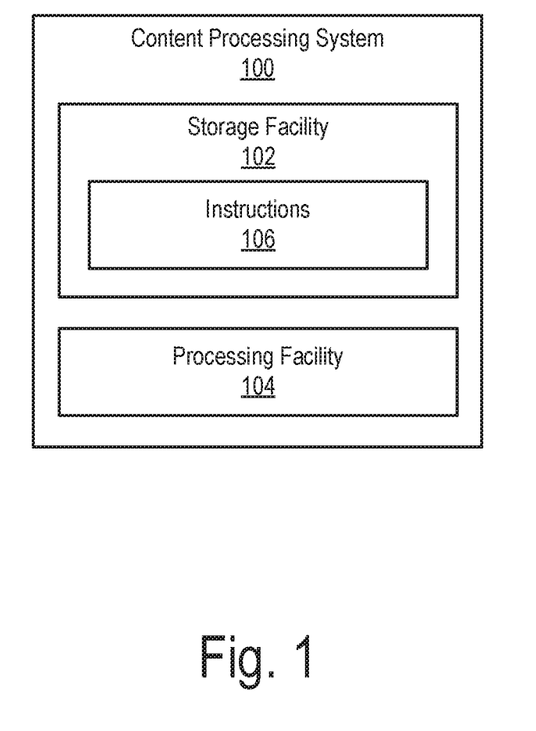
FIG. 1 illustrates an exemplary content processing system for processing arrays of sequenced data blocks according to embodiments described herein.

FIG. 1 illustrates an exemplary 3D content processing system 100 ("system 100") for transmitting arrays of sequenced data blocks. For example, as will be described in more detail below, system 100 may be a sending device (e.g., a content generation system, a content distribution system, etc.) configured to transmit sequenced data blocks. Additionally or alternatively, system 100 may be a receiving device (e.g., a content presentation system, a content distribution system, etc.) configured to receive sequenced data blocks.

As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). Although facilities 102 and 104 are shown to be separate facilities in FIG. 1, facilities 102 and 104 may be combined into fewer facilities, such as into a single facility, or divided into more facilities as may serve a particular implementation. In some examples, facilities 102 and 104 may be distributed between multiple computing devices or systems (e.g., multiple servers, etc.) and/or between multiple locations as may serve a particular implementation. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, generated, used, transmitted, and/or received by processing facility 104 in a particular implementation, such as arrays of related, sequenced data blocks. Additionally, storage facility 102 may also maintain data received directly from another device, such as by a remote direct memory access (RDMA) protocol.

Processing facility 104 may be configured to perform (e.g., execute instructions 106 stored in storage facility 102 to perform) various functions associated with transmitting sequenced data blocks. For example, processing facility 104 may be configured to send and receive data to establish a communication session for sending and/or receiving sequenced data blocks.

These and other operations that may be performed by system 100 (e.g., processing facility 104) are described herein. In the description that follows, any references to functions performed by system 100 may be understood to be performed by processing facility 104 based on instructions 106 stored in storage facility 102.

Figure 2:
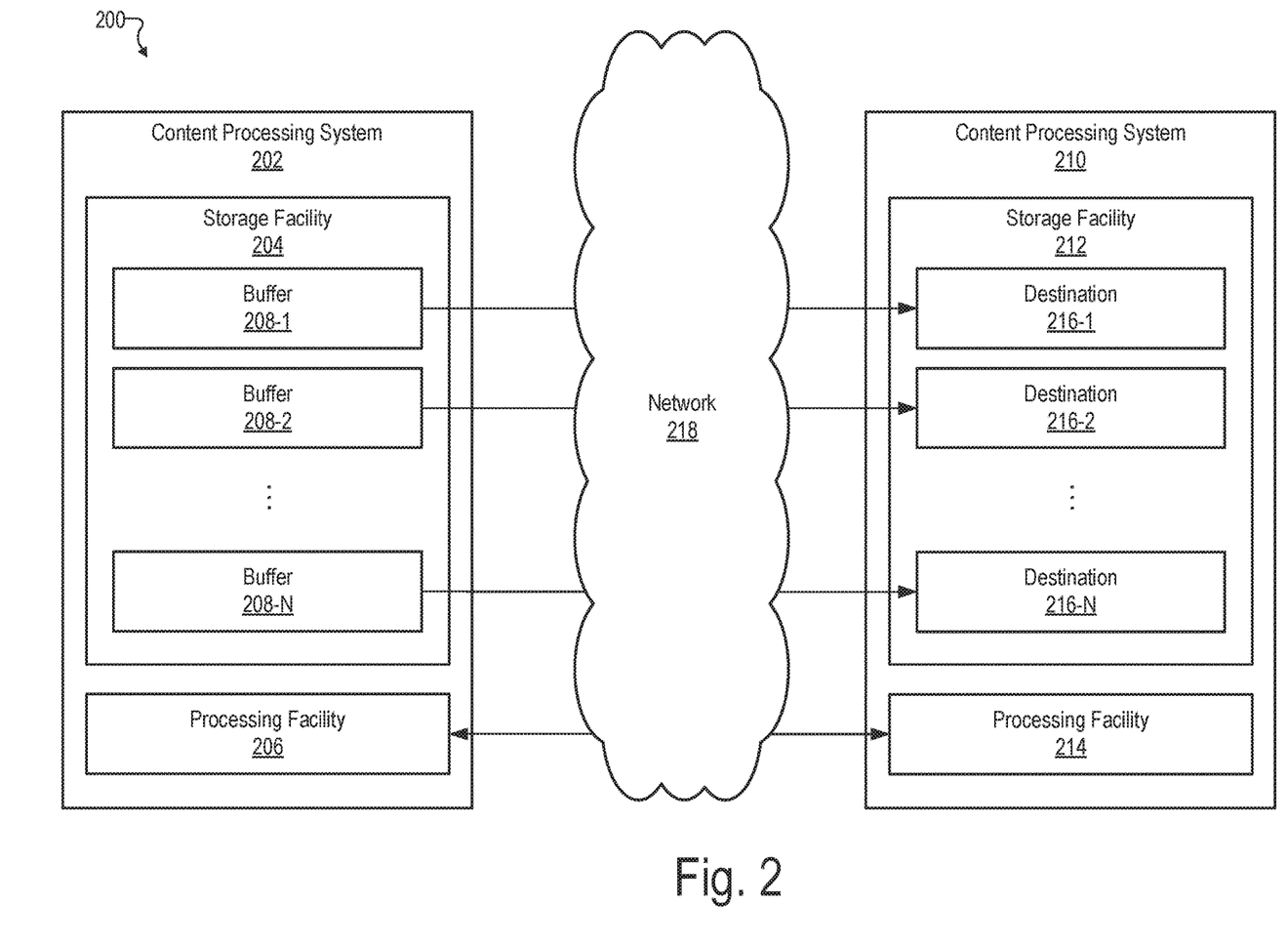
FIG. 2 illustrates an exemplary configuration of content processing systems for transmitting arrays of sequenced data blocks according to embodiments described herein.

FIG. 2 illustrates an exemplary configuration 200 of a content processing system 202 and a content processing system 210. Content processing system 202 and content processing system 210 may be implementations of content processing system 100. As such, content processing system 202 includes a storage facility 204 and a processing facility 206. Similarly, content processing system 210 includes a storage facility 212 and a processing facility 214. Content processing system 202 and content processing system 210 may be communicatively coupled through a network 218 or any other suitable communicative connection.

In this example, content processing system 202 is acting as a sending device and content processing system 210 is acting as a receiving device. As shown, storage facility 204 includes a plurality of buffers 208 (e.g., buffer 208-1 through buffer 208-N). Buffers 208 may maintain an array of data blocks. For example, each of buffers 208 may respectively maintain a data block of the array of data blocks. The array of data blocks may include data blocks that are sequenced (e.g., time sequenced, frame sequenced, etc.) and related to one another. For instance, the data blocks may be any suitable combination of a video stream, a corresponding audio stream, a corresponding stream of depth map frames, a corresponding stream of color frames, a corresponding stream of point clouds, a corresponding stream of voxel data, a corresponding stream of patches (e.g., color and depth information), a corresponding stream of metadata, a corresponding data stream (e.g., subtitles, etc.), sparse buffers (e.g., buffers including coordinates and values specified in-line which may have different datatypes), or any other suitable related, sequenced data blocks.

Content processing system 202 may be configured to send the array of data blocks to content processing system 210. For example, content processing system 202 may send the array of data blocks using an RDMA protocol. In order to use RDMA to send the array of data blocks, content processing system 202 and content processing system 210 may send and receive data to establish an agreement for parameters for the communication session (e.g., a handshake). For instance, the data sent and received by content processing system 202 and content processing system 210 may include parameters (e.g., memory addresses, block sizes, message sizes, etc.) used by content processing system 202 and content processing system 210 to set up a transfer of data blocks using RDMA. Example parameters and protocols for exchanging such parameters are further described herein. Without such an agreement, transferring the array of data blocks may encounter a variety of possible errors, which may interrupt the transfer. Example errors are described herein.

Once the communication session is established and parameters exchanged, the sending device (content processing system 202) may send the blocks of data to the receiving device (content processing system 210). Using the RDMA protocol, the sending device may send the blocks of data directly to memory locations on the receiving device, represented by a plurality of destinations 216 (e.g., destination 216-1 through destination 216-N) on content processing system 210. The parameters exchanged for establishing the communication session may include a mechanism to ensure an order of buffer 208-1 through buffer 208-N is preserved so that each of buffers 208 may be sent to a respective destination 216-1 through destination 216-N. For example, the sending device may send a first block of data maintained in buffer 208-1 to destination 216-1, a second block of data maintained in buffer 208-2 to destination 216-2, and so forth as shown. In this way, the sending device may transmit an array (or a plurality of arrays) of related, sequenced data blocks.

The systems shown in configuration 200 may each be implemented by computing systems comprising computer hardware and software. In some examples, some of the systems may include or be implemented by off-the-shelf server computers or portable devices that include general purpose processors (e.g., central processing units ("CPUs"), graphics processing units ("GPUs"), etc.). For instance, the systems may include a combination of CPUs and GPUs, such as CPUs communicating to set up the RDMA protocol to access GPU memories on remote devices. In the same or other examples, certain of the systems shown in configuration 200 may include or be implemented by more specialized hardware or software such as, for example, an application specific integrated circuit ("ASIC"), a field programmable gate array ("FPGA"), or other hardware configured specifically for the particular system or device being implemented. Custom software such as a 3D content application may be executed by processors on both the server side and the client side, may be implemented by the custom hardware (e.g., one or more ASICs, one or more FPGAs, etc.), or may be implemented using a combination of hardware and software.

Figure 3:
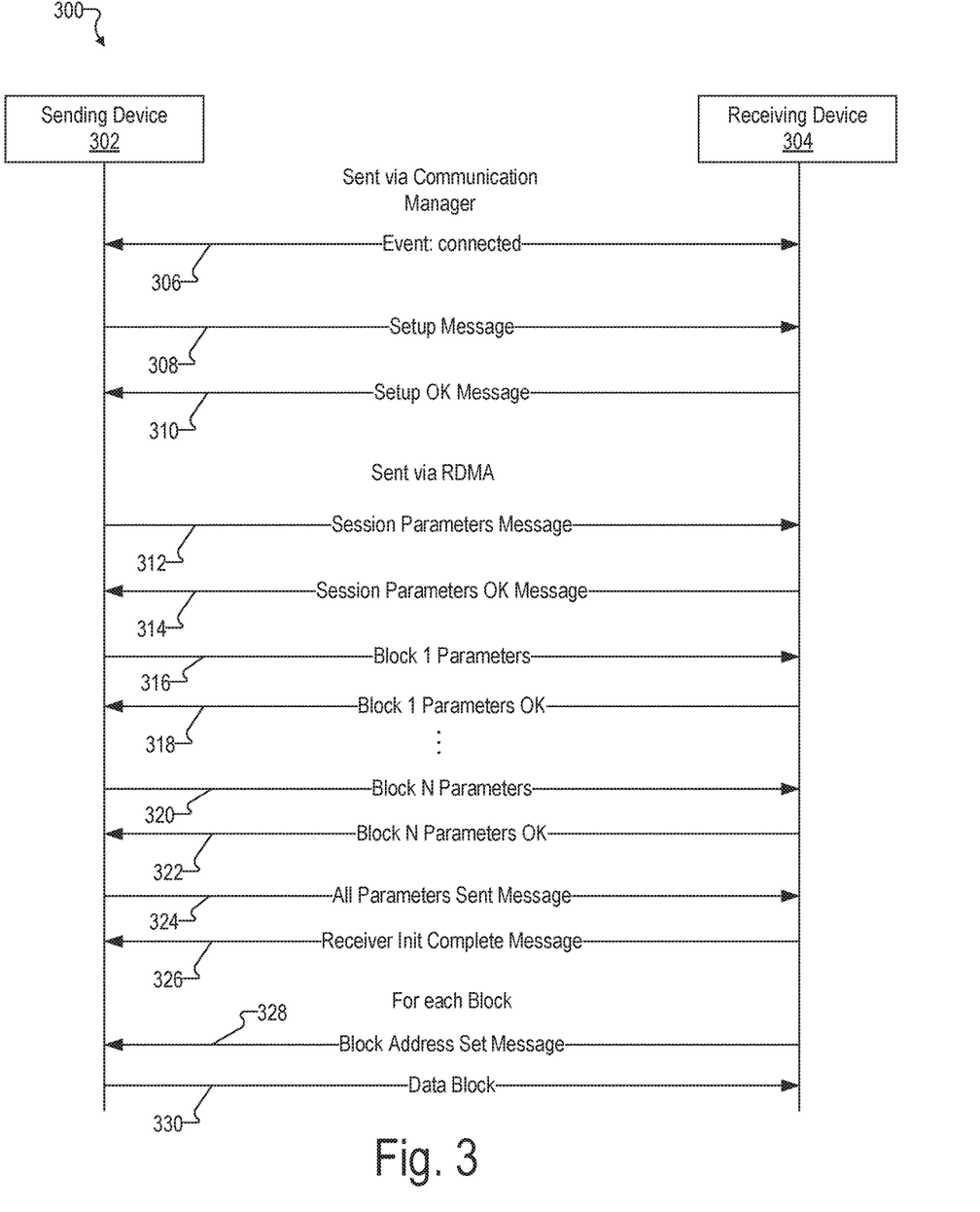
FIG. 3 illustrates an exemplary protocol message sequence for transmitting arrays of sequenced data blocks according to embodiments described herein.

FIG. 3 illustrates an exemplary diagram 300 showing an example protocol for transmitting an array of sequenced data blocks. Diagram 300 shows a sending device 302 and a receiving device 304. Sending device 302 and receiving device 304 may be implementations of content processing system 100. The example protocol may be configured to establish a communication session and allow sending device 302 to send an array of sequenced data blocks to receiving device 304. The protocol may include messages sent from sending device 302 to receiving device 304 and vice versa to establish the communication session. Messages may carry data including information such as parameters and other information for establishing the communication session and facilitating transfer of the array of data blocks.

For example, the protocol may start with a message 306 that indicates a communicative connection is established between sending device 302 and receiving device 304. As described, the communicative connection may be established via any suitable communication channel, such as a network (e.g., the internet, an intranet, a local area network, etc.). Once the communicative connection is established, sending device 302 may send a setup message 308 to receiving device 304 that includes setup information. Setup information may include any suitable information for setting up a remainder of the communication session. For instance, setup information may include information about the data blocks, such as a quantity of the data blocks in the array of data blocks, a size of the data blocks, datatypes of the data blocks, memory addresses (on the sending device) of the data blocks, etc. Datatypes of the data blocks may include predefined system-specific datatypes. For instance, a raw RGB image datatype may be defined as a 3-channel, 1 byte per channel, integer data block. As another instance, a depth buffer datatype may be defined as a 1-channel, 4-byte per channel, floating point data block. Any other suitable datatypes may be defined by the system. Setup information may further include information about the communication session, such as a memory address for receiving device 304 to send error messages, a memory address for receiving device 304 to send a setup acknowledgement message, information about sending device 302 (e.g., a device name, etc.), a protocol version identifier of the protocol, an application version identifier of an application configured to access the data blocks, etc. Setup message 308 may also include an identifier to explicitly identify setup message 308 as a setup message. In some examples, setup message 308 may further indicate a resetting and/or a reconfiguration of the communication session based on the setup information, such as if sending device 302 sends another setup message 308 at a later point in the protocol.

Upon receiving setup message 308, receiving device 304 may initialize components of receiving device 304 to prepare to receive the array of data blocks according to the parameters sent in setup message 308. If the parameters are compatible for receiving device 304 to receive the array of data blocks, receiving device 308 may send a setup acknowledgment message 310 to sending device 302. Setup acknowledgment message 310 may include additional setup information from receiving device 304. Such additional setup information may include a memory address for sending device 302 to send error messages, one or more memory addresses for one or more subsequent messages from sending device 302, a corresponding protocol version identifier of receiving device 304, etc. Setup acknowledgment message 310 may also include an identifier to explicitly identify setup acknowledgment message 310 as a setup acknowledgment message.

Upon receiving setup acknowledgment message 310, sending device 302 may send one or more parameter messages. For example, the one or more parameter messages may include a session parameters message 312. Session parameters message 312 may include additional information about the communication session, such as information for processing the array of data blocks. Such information may be provided in any suitable manner, such as a data structure specific to and/or defined by the application configured to process the array of data blocks. Session parameters message 312 may also include a memory address for receiving device 304 to send a session parameters acknowledgment message. Session parameters message 312 may also include a protocol version identifier and/or an identifier explicitly identifying session parameters message 312 as a session parameters message.

Upon receiving session parameters message 312, receiving device 304 may send a session parameters acknowledgment message 314. Session parameters acknowledgment message 314 may include one or more memory addresses for one or more block parameter messages from sending device 302. In some examples, messages may generally include such a memory address for a subsequent acknowledgment message and/or subsequent message. Memory addresses may be implemented in any suitable manner. For example, memory addresses may include some or all of a pointer to a virtual, logical, or physical memory location, a remote key for remotely accessing the memory location, an identifier, a tag, a handle, etc. Session parameters acknowledgment message 314 may also include a protocol version identifier and/or an identifier explicitly identifying session parameters acknowledgment message 314 as a session parameters acknowledgment message. In some examples, messages may generally include a protocol version identifier and/or an identifier explicitly identifying a type of message.

Upon receiving session parameters acknowledgment message 314, sending device 302 may send additional parameter messages. For example, additional parameter messages may include one or more block parameter messages, such as a first block parameter message 316. First block parameter message 316 may include parameters relating to a first data block of the array of data blocks. For instance, parameters may include a block index, application-specific parameters, etc.

Receiving device 304 may reply to the one or more block parameter messages with one or more block parameter acknowledgment messages. For example, in response to first block parameter message 316, receiving device 304 may send a first block parameter acknowledgment message 318. First block parameter acknowledgment message 318 may include the block index, a memory address for a next block parameter message, etc.

Sending device 302 may send a block parameter message for each of the data blocks in the array of data blocks. Receiving device 304 may respond to each block parameter message with a block parameter message acknowledgment message. For example, diagram 300 shows sending device 302 sending an Nth block parameter message 320 and receiving device responding with an Nth block parameter acknowledgment message 322.

Upon receiving Nth block parameter acknowledgment message 322, sending device 302 may send an all parameters sent message 324 indicating that all parameter messages have been sent. The all parameter sent message 324 may allow for sending device 302 to send additional parameter messages prior to all parameter sent message 324 and/or included in all parameter sent message 324.

Upon receiving all parameter sent message 324, receiving device 304 may send a receiver initialization complete message 326 indicating that receiving device 304 has completed initialization and is ready to receive the array of data blocks.

Upon receiving receiver initialization complete message 326, sending device 302 may complete setup or initialization for sending device 302. Sending device 302 may then wait for receiving device 304 to send a block address set message 328 for a first data block of the array of data blocks. For example, each block address set message may include a memory address for sending device 302 to send the data block. As sending device 302 receives block address set messages for each of the data blocks, sending device 302 may respond with the data block (e.g., a data block 330). In this manner, sending device 302 may transfer an array of data blocks to receiving device 304 using RDMA.

However, there may also be instances in which the sending and receiving of messages results in an error rather than a successful agreement to transfer the array of data blocks. In such instances, sending device 302 may send an error message to the error message memory address provided by receiving device 304 and/or receiving device 304 may send an error message to the error message memory address provided by sending device 302, depending on where the error occurred. In this way, both sending device 302 and receiving device 304 may have information regarding the error. Sending device 302 and receiving device 304 may then abort the communication session and/or retry establishing a new communication session.

For instance, between each successful transfer of messages between sending device 302 and receiving device 304, both sending device 302 and receiving device 304 may be in a state in which the device is waiting for a next message. However, if sending device 302 encounters an error, sending device 302 may enter an error state in which the communication session is aborted. Sending device 302 may provide an error message to receiving device 304 and return to an initial state (e.g., an uninitialized state) of sending device 302. Receiving device 304 may also return to an initial state of receiving device 304 in response to receiving the error message. Likewise, if receiving device 304 encounters an error, receiving device 304 may enter an error state in which the communication session is aborted and provide an error message to sending device 302. Receiving device 304 and sending device 302 may then both return to initial states of the respective devices.

Example errors may include mismatches and/or incompatibilities with parameters. For instance, as described above, each message may include information regarding a protocol version. Sending device 302 and/or receiving device 304 may compare protocol versions to ensure compatibility and throw an error if protocol versions are incompatible. Similarly, application version incompatibility may result in an error. Additionally or alternatively, incompatibility in tags for the data blocks may result in an error. Additionally or alternatively, any other mismatches and/or incompatibilities in parameters may result in an error. Additionally or alternatively, typical network, transmission, and/or computer errors (e.g., network disconnections, communication disruptions, data blocks that are too large for the network and/or the receiving device, messages that are too large for the network, etc.) may result in an error that aborts the communication session.

Example protocols may include commands and/or conventions to minimize errors, such as errors encountered using RDMA. For example, sending device 302 and/or receiving device 304 may use a Compute Unified Device Architecture (CUDA) platform for communication and/or transferring of data blocks. The protocol may include commands to prevent data blocks from being transferred before the data blocks are ready to be transmitted on sending device 302. Additionally or alternatively, commands may prevent transmitting of the data blocks before memory buffers are allocated on receiving device 304. Additionally or alternatively, commands may prevent memory buffers on receiving device 304 from being overwritten once provided to sending device 302. The protocol may include any other such suitable commands.

While diagram 300 shows an example exchange of messages for a protocol for transferring an array of data blocks, other examples may omit, add to, reorder, and/or modify any of the messages shown in diagram 300. For instance, block parameter messages 1-N may be combined into one message or any other suitable number of messages. Additionally or alternatively, session parameters message 312 may also be combined with first block parameters message 316 and/or a combined block parameters message. Additionally or alternatively, all parameters sent message 324 and receiver initialization complete message 326 may be omitted. Additionally or alternatively, multiple block address set messages may be combined into one or any other suitable number of messages. Additionally or alternatively, one or more block parameters messages may be combined with corresponding one or more block address set messages. Other examples may include any other suitable combinations, additions, omissions, etc.

Additionally or alternatively, while examples of messages have been described above, other examples may omit, add to, and/or modify content of messages sent and received by sending device 302 and receiving device 304. For example, while the messages described above each included a protocol version, a memory address for subsequent message, and an identifier identifying the message, in other examples some of the messages may omit such information.

In some examples, message 306, setup message 308, and setup acknowledgment message 310 may be sent and received using a communication manager (CM), rather than directly using RDMA. Sending and receiving these messages using the CM may allow sending device 302 and receiving device 304 to not know beforehand memory address locations and message sizes for setup message 308 and/or setup acknowledgment message 310. In some examples, the remaining parameter messages may be sent and received using RDMA. In other examples, the remaining parameter messages may continue to be sent and received using the CM. In such examples, memory addresses for subsequent messages may be omitted in the messages.

Figure 4:
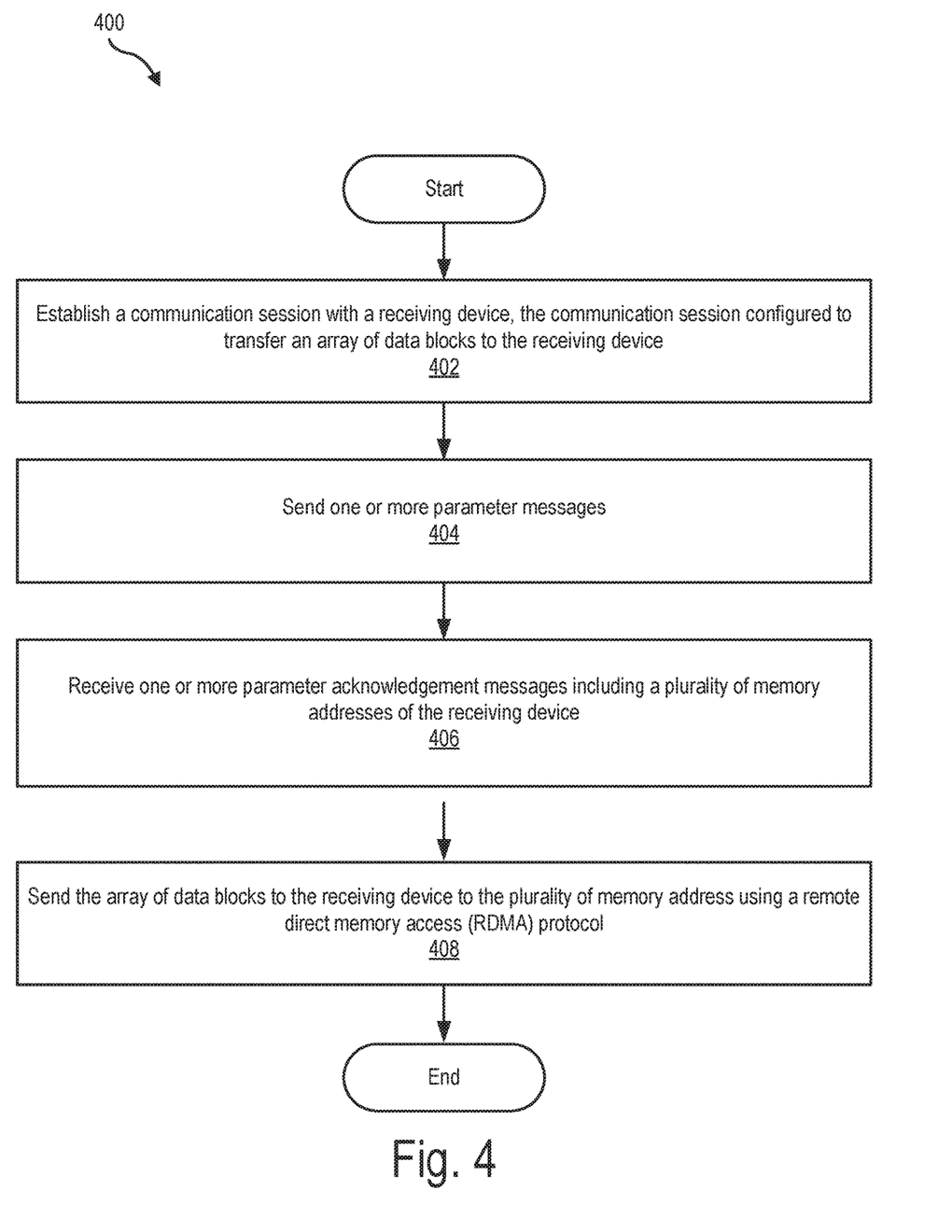
FIGS. 4-5 illustrate various exemplary methods for transmitting arrays of sequenced data blocks according to embodiments described herein.

FIG. 4 illustrates an exemplary method 400. One or more of the operations shown in FIG. 4 may be performed by any of the systems or devices described herein. While FIG. 4 illustrates exemplary operations according to one embodiment, other embodiments may omit, add to, reorder, and/or modify any of the operations shown in FIG. 4.

In step 402, a sending device establishes a communication session with a receiving device, the communication session configured to transfer an array of related, sequenced data blocks from the sending device to the receiving device. Step 402 may be performed in any of the ways described herein.

In step 404, the sending device sends one or more parameter messages including parameters associated with the array of related, sequenced data blocks. Step 404 may be performed in any of the ways described herein.

In step 406, the sending device receives one or more parameter acknowledgement messages to the one or more parameter messages, the one or more parameter acknowledgement messages including a plurality of memory addresses of the receiving device, the plurality of memory addresses including a respective memory address for each data block of the array of related, sequenced data blocks. Step 406 may be performed in any of the ways described herein.

In step 408, the sending device sends the array of related, sequenced data blocks to the receiving device, each data block of the array of related, sequenced data blocks sent to the respective memory address using a remote direct memory access (RDMA) protocol. Step 408 may be performed in any of the ways described herein.

Figure 5:
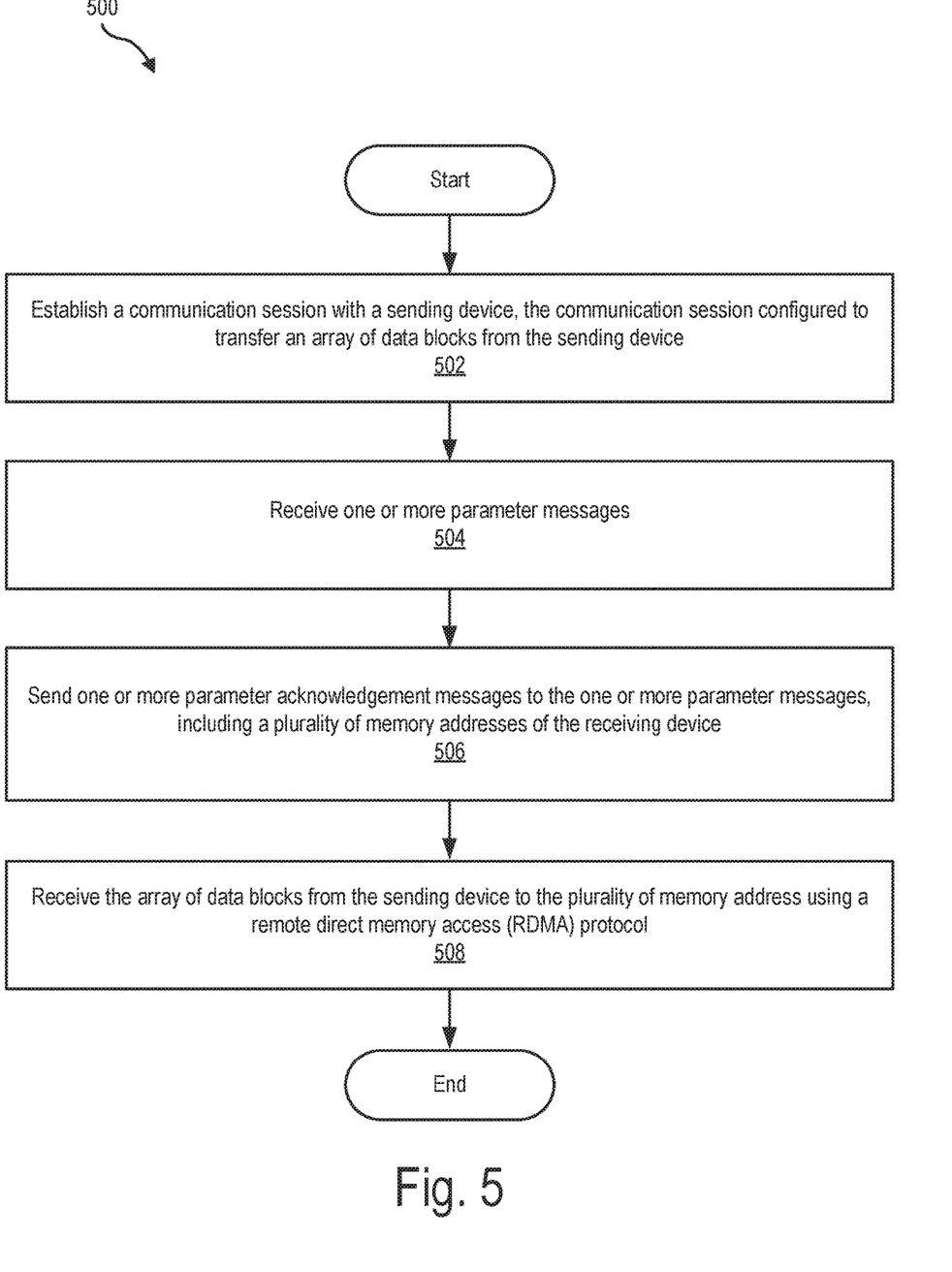

FIG. 5 illustrates an exemplary method 500. One or more of the operations shown in FIG. 5 may be performed by any of the systems or devices described herein. While FIG. 5 illustrates exemplary operations according to one embodiment, other embodiments may omit, add to, reorder, and/or modify any of the operations shown in FIG. 5.

In step 502, a receiving device establishes a communication session with a sending device, the communication session configured to transfer an array of related, sequenced data blocks from the sending device to the receiving device. Step 502 may be performed in any of the ways described herein.

In step 504, the receiving device receives one or more parameter messages including parameters associated with the array of related, sequenced data blocks. Step 504 may be performed in any of the ways described herein.

In step 506, the receiving device sends one or more parameter acknowledgement messages to the one or more parameter messages, the one or more parameter acknowledgement messages including a plurality of memory addresses of the receiving device, the plurality of memory addresses including a respective memory address for each data block of the array of related, sequenced data blocks. Step 506 may be performed in any of the ways described herein.

In step 508, the receiving device receives the array of related, sequenced data blocks from the sending device, each data block of the array of related, sequenced data blocks sent to the respective memory address using a remote direct memory access (RDMA) protocol. Step 508 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
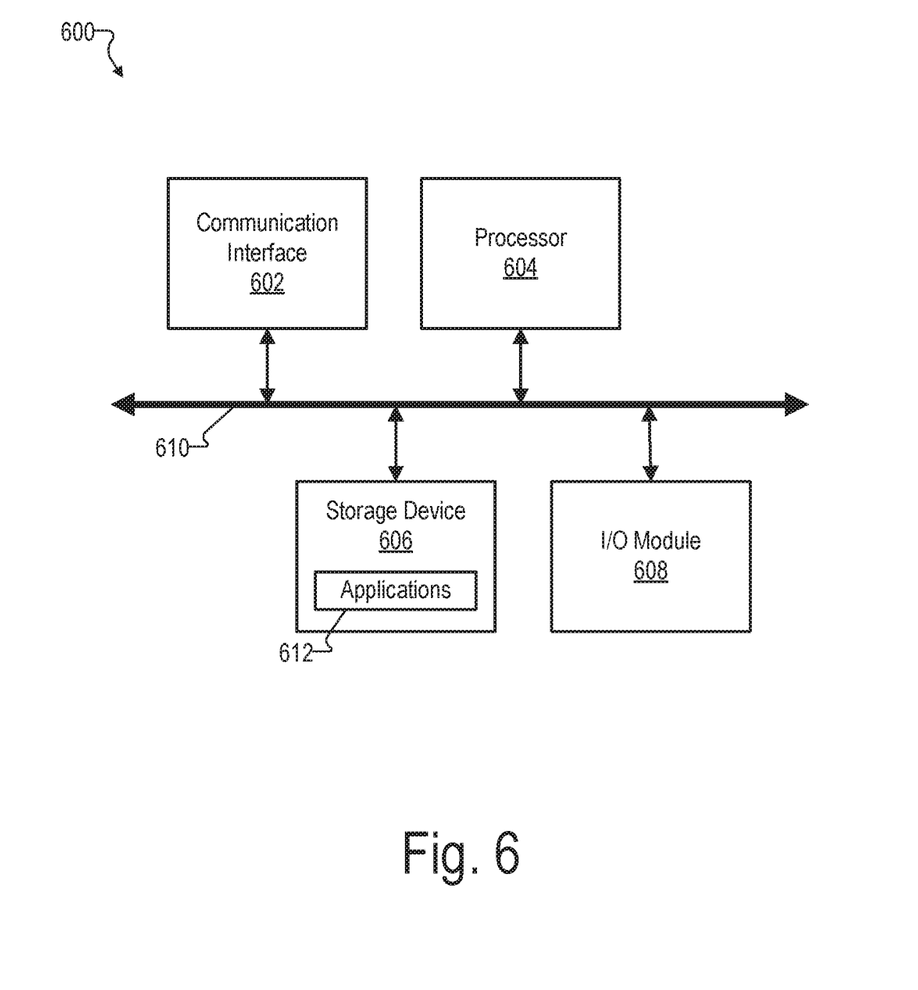
FIG. 6 illustrates an exemplary computing device according to embodiments described herein.

FIG. 6 illustrates an exemplary computing device 600 that may be specifically configured to perform one or more of the processes described herein. For example, computing device 600 may implement a 3D content processing system such as system 100, an implementation thereof such as content processing system 202, content processing system 210, or any other system or device described herein (e.g., sending device 302, receiving device 304, an implementation or component of any of these, etc.).

As shown in FIG. 6, computing device 600 may include a communication interface 602, a processor 604, a storage device 606, and an input/output ("I/O") module 608 communicatively connected via a communication infrastructure 610. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 612 residing within storage device 606 may be configured to direct processor 604 to perform one or more processes or functions associated with processing facility 104 of system 100. Likewise, storage facility 102 of system 100 may be implemented by or within storage device 606.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiments without departing from the scope of the present disclosure, as will be appreciated in view of the disclosure.

Computer-executable instructions described herein will be understood to comprise instructions and data which cause a general purpose computer, special purpose computer, GPU, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general or specific purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general or specific purpose hardware), specific hardware embodiments or a combination of software and specific hardware embodiments are also possible and contemplated.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    establishing, by a sending device, a communication session with a receiving device, the communication session configured to transfer an array of related, sequenced data blocks from the sending device to the receiving device, the establishing the communication session including sending to the receiving device a setup message including at least one of:
        a protocol version identifier of a protocol for the communication session, or
        an application version identifier of an application configured to access the array of related, sequenced data blocks;
    sending, by the sending device, one or more parameter messages including parameters associated with the array of related, sequenced data blocks;
    receiving, by the sending device, one or more parameter acknowledgement messages to the one or more parameter messages, the one or more parameter acknowledgement messages including a plurality of memory addresses of the receiving device, the plurality of memory addresses including a respective memory address for each data block of the array of related, sequenced data blocks; and
    sending, by the sending device, the array of related, sequenced data blocks to the receiving device, each data block of the array of related, sequenced data blocks sent to the respective memory address using a remote direct memory access (RDMA) protocol.

2. The method of claim 1, wherein the setup message further includes at least one of:
    a quantity of data blocks in the array of related, sequenced data blocks,
    a size of the data blocks in the array of related, sequenced data blocks, or
    a datatype of the data blocks in the array of related, sequenced data blocks.

3. The method of claim 2, wherein the setup message further includes a memory address of the sending device for receiving error messages from the receiving device.

4. The method of claim 2, wherein establishing the communication session includes receiving, by the sending device from the receiving device, a setup acknowledgment message.

5. The method of claim 4, wherein the setup acknowledgment message includes at least one of:
    one or more memory addresses of the receiving device for sending the one or more parameter messages, or
    a memory address of the receiving device for sending error messages to the receiving device.

6. The method of claim 4, wherein the setup acknowledgment message includes at least one of:
    a matching protocol version identifier from the receiving device, or an acknowledgment of the protocol version identifier sent by the sending device.

7. The method of claim 1, wherein the one or more parameter messages include information for processing the array of related, sequenced data blocks.

8. The method of claim 1, wherein the one or more parameter messages include block parameter information for each data block of the array of related, sequenced data blocks.

9. The method of claim 8, wherein the one or more parameter messages includes a respective parameter message for each data block of the array of related, sequenced data blocks.

10. The method of claim 9, wherein:
the one or more parameter messages includes a first parameter message and a second parameter message, and
the sending the one or more parameter messages includes sending the second parameter message in response to receiving a parameter acknowledgment message to the first parameter message.

11. A method comprising:
establishing, by a receiving device, a communication session with a sending device, the communication session configured to transfer an array of related, sequenced data blocks from the sending device to the receiving device, the establishing the communication session including receiving from the sending device a setup message including at least one of:
a protocol version identifier of a protocol for the communication session, or
an application version identifier of an application configured to access the array of related, sequenced data blocks;
receiving, by the receiving device, one or more parameter messages including parameters associated with the array of related, sequenced data blocks;
sending, by the receiving device, one or more parameter acknowledgement messages to the one or more parameter messages, the one or more parameter acknowledgement messages including a plurality of memory addresses of the receiving device, the plurality of memory addresses including a respective memory address for each data block of the array of related, sequenced data blocks; and
receiving, by the receiving device, the array of related, sequenced data blocks from the sending device, each data block of the array of related, sequenced data blocks sent to the respective memory address using a remote direct memory access (RDMA) protocol.

12. The method of claim 11, wherein the setup message further includes at least one of:
a quantity of data blocks in the array of related, sequenced data blocks,
a size of the data blocks in the array of related, sequenced data blocks,
a datatype of the data blocks in the array of related, sequenced data blocks, or
a memory address of the sending device for receiving error messages from the receiving device.

13. The method of claim 12, wherein establishing the communication session includes sending, by the receiving device to the sending device, a setup acknowledgment message including at least one of:

one or more memory addresses of the receiving device for sending the one or more parameter messages,
a memory address of the receiving device for sending error messages to the receiving device,
a matching protocol version identifier from the receiving device, or
an acknowledgment of the protocol version identifier sent by the sending device.

14. The method of claim 11, wherein the one or more parameter messages include information for processing the array of related, sequenced data blocks.

15. The method of claim 11, wherein the one or more parameter messages include block parameter information for each data block of the array of related, sequenced data blocks.

16. The method of claim 15, wherein the one or more parameter messages includes a respective parameter message for each data block of the array of related, sequenced data blocks.

17. A system comprising:
a memory storing instructions;
a processor communicatively coupled to the memory and configured to execute the instructions to:
establish a communication session with a device, the communication session configured to transfer an array of related, sequenced data blocks to the device, the establishing the communication session including sending to the device a setup message including at least one of:
a protocol version identifier of a protocol for the communication session, or
an application version identifier of an application configured to access the array of related, sequenced data blocks;
send one or more parameter messages including parameters associated with the array of related, sequenced data blocks;
receive one or more parameter acknowledgement messages to the one or more parameter messages, the one or more parameter acknowledgement messages including a plurality of memory addresses of the device, the plurality of memory addresses including a respective memory address for each data block of the array of related, sequenced data blocks; and
send the array of related, sequenced data blocks to the device, each data block of the array of related, sequenced data blocks sent to the respective memory address using a remote direct memory access (RDMA) protocol.

18. The system of claim 17, wherein the setup message further includes at least one of:
a quantity of data blocks in the array of related, sequenced data blocks,
a size of the data blocks in the array of related, sequenced data blocks,
a datatype of the data blocks in the array of related, sequenced data blocks, or
a memory address of the sending device for receiving error messages from the receiving device.

19. The system of claim 17, wherein the one or more parameter messages include block parameter information for each data block of the array of related, sequenced data blocks.

* * * * *